United States Patent

Miller

[11] 4,042,356
[45] Aug. 16, 1977

[54] BAG HOUSE CELL PLATE AND FILTER BAG ATTACHMENT THERETO

[75] Inventor: Edward M. Miller, San Rafael, Calif.

[73] Assignee: Industrial Clean Air, Inc., Berkeley, Calif.

[21] Appl. No.: 663,554

[22] Filed: Mar. 3, 1976

[51] Int. Cl.² .......................................... B01D 46/02
[52] U.S. Cl. .................................. 55/341 R; 55/379; 55/381; 55/507; 55/509; 55/DIG. 26
[58] Field of Search ................. 55/302, 376, 377, 378, 55/379, 381, 492, DIG. 26, 374, 341 R, 341 NT, 507–509; 277/183–186, 230, 235 R

[56] References Cited

U.S. PATENT DOCUMENTS

| | | | |
|---|---|---|---|
| 1,821,202 | 9/1931 | Birkholz | 55/374 |
| 2,143,664 | 1/1939 | Snyder | 55/DIG. 26 |
| 3,401,505 | 9/1968 | Ballard | 55/379 |
| 3,458,207 | 7/1969 | Conti | 277/83 |
| 3,481,824 | 12/1969 | Poltorak | 277/230 |
| 3,813,853 | 6/1974 | Anderson | 55/302 |
| 3,844,750 | 10/1974 | Ray | 55/302 |
| 3,853,509 | 12/1974 | Leliaert | 55/379 |
| 3,937,621 | 2/1976 | Graveley | 55/377 |
| 3,951,627 | 4/1976 | Barr, Jr. et al. | 55/379 |

FOREIGN PATENT DOCUMENTS

| | | | |
|---|---|---|---|
| 485,039 | 5/1938 | United Kingdom | 55/DIG. 26 |

Primary Examiner—Frank W. Lutter
Assistant Examiner—David L. Lacey
Attorney, Agent, or Firm—Phillips, Moore, Weissenberger, Lempio & Majestic

[57] ABSTRACT

In a bag house, the flat cell plate has integral annular walls drawn outwardly from the plane of the cell plate, the walls each terminating in a lip forming a circular opening lying in a plane parallel and spaced from the plane of the cell plate. Vertical tubular filter bags are secured to the cell plate by a spring in each bag which forces an outwardly facing groove on the open end of the bag into engagement with the lip to which the bag is attached.

7 Claims, 6 Drawing Figures

U.S. Patent    Aug. 16, 1977    4,042,356
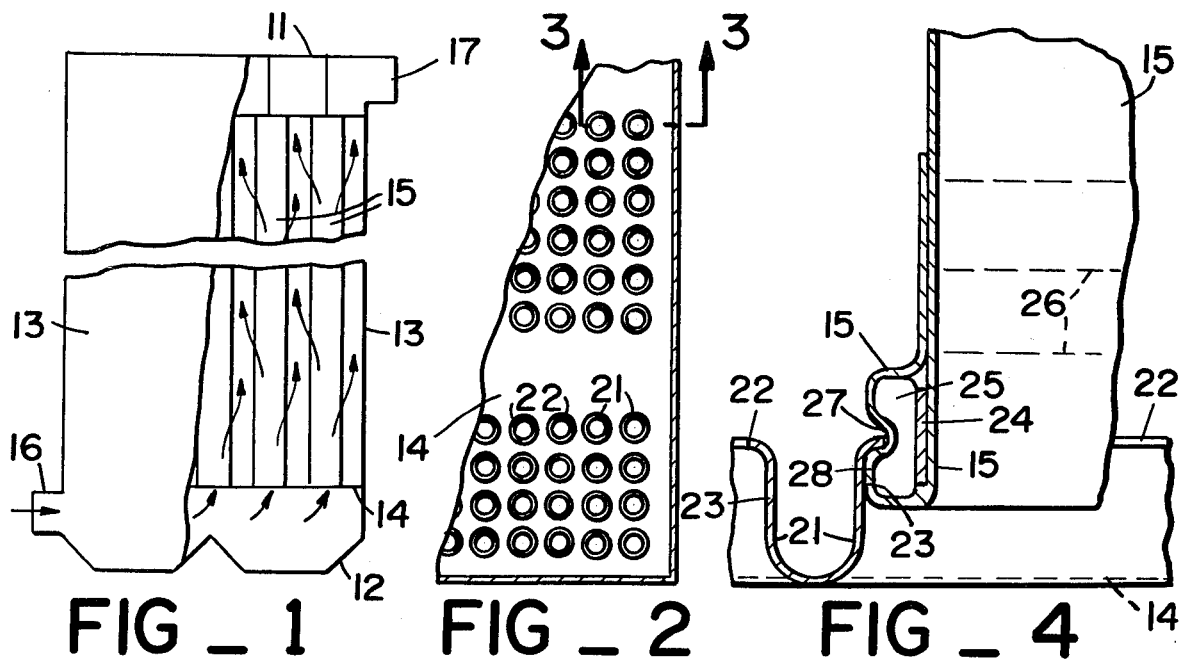
FIG _ 1   FIG _ 2   FIG _ 4
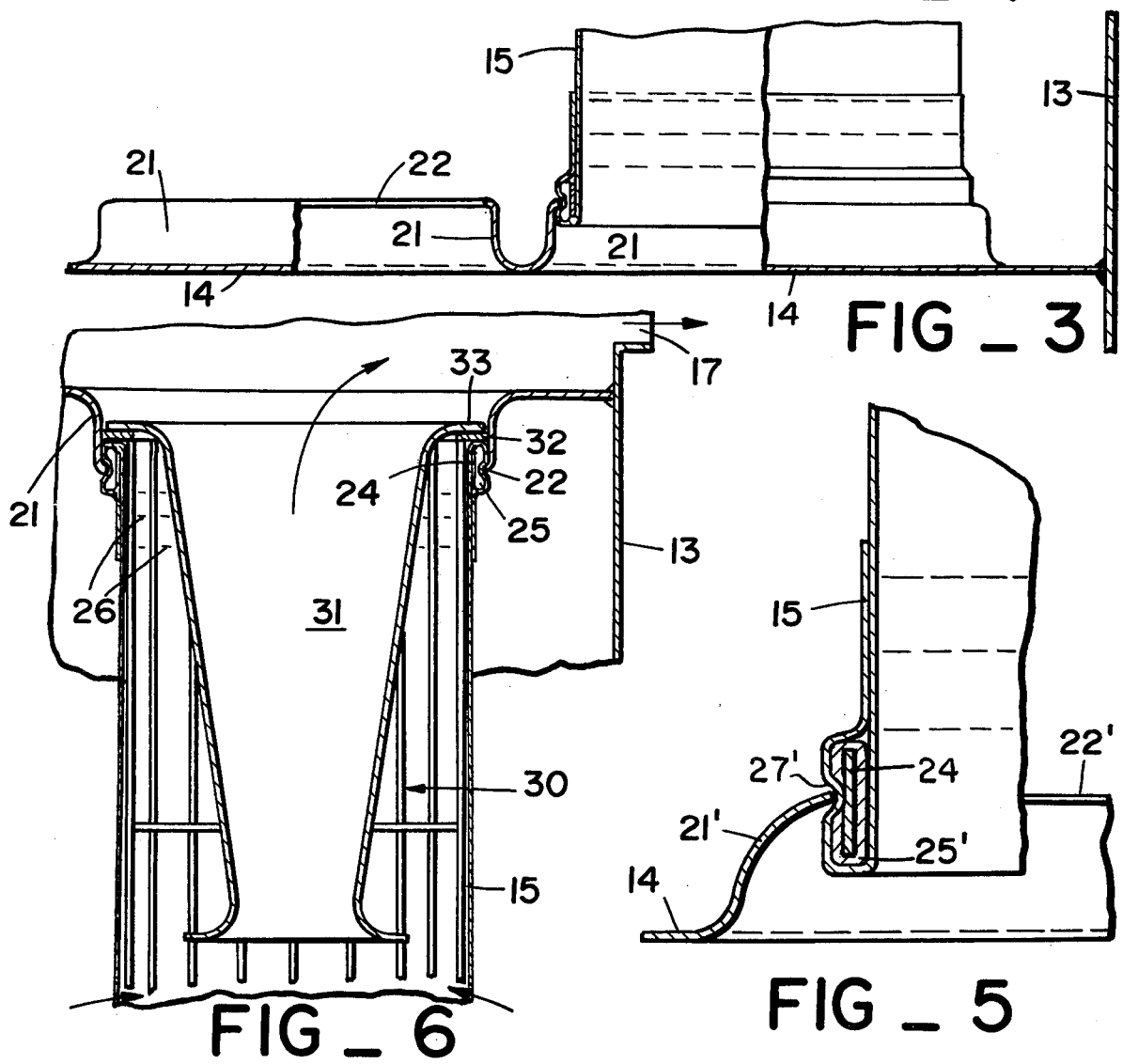
FIG _ 3
FIG _ 6   FIG _ 5

BAG HOUSE CELL PLATE AND FILTER BAG ATTACHMENT THERETO

BACKGROUND OF THE INVENTION

This invention relates to bag houses having tubular filter bags vertically suspended in the house and more particularly to the construction of the cell plate to which the open ends of the bags are attached.

FIG. 1 of the drawings illustrates a typical bag house to which the present invention relates, the bag house having a ceiling 11, hopper floor 12 and side walls 13 forming a completely enclosed structure and a horizontal cell plate 14 dividing the interior of the house into upper and lower compartments. The cell plate has a plurality of openings therethrough. A plurality of tubular cloth filter bags 15, each having a closed upper end and an open lower end, are suspended in the bag house, the open ends of the bags being connected to the cell plate so that the open end of each bag is in communication with one of the cell plate openings. Dirty air enters through inlet 16 into the lower compartment of the house and flows up into the bags through openings in the cell plate. As the air passes through the bag walls the entrained dirt particles are caught on the inside of the tubes and the clean air exits through outlet 17 from the upper compartment of the house.

There are several ways in which filter bags have been attached to the cell plate. One commonly used method is to punch holes through the flat cell plate, one for each bag to be used. A cylindrical thimble of relatively thin-gauge material is secured in each hole with one end of the thimble being rolled onto the lip of the cell plate opening and with the body of the thimble projecting upwardly from the cell plate. The open end of the bag fits down onto the outer surface of the thimble body and is clamped thereto by a band passing around the outside of the bag.

This manner of attachment has advantages in that the interior of the bag adjacent the cell plate is protected, by the height of the thimble inside the bag, against abrasion by the entrained dirt particles as they flow across the lower chamber and then up into the bag. Also, during the times when a workman enters the bag house for inspection or maintenance of the filter bags and moves about on the upper surface of the cell plate, the thimble will protect the bag against being kicked accidentally by the foot of the workman. Similarly, if a ladder is used inside the upper compartment with its legs resting on the cell plate, the thimble will prevent the ladder legs from slipping and falling through a cell plate opening.

On the other hand, forming the thimble and fastening them to the cell plate openings is a relatively expensive procedure. Similarly, the attachment of the bags to the thimbles by the use of band clamps is a tedious and time-consuming process which increases the cost of initial installation and subsequent maintenance.

In addition, since the thimbles are made of relatively thin-gauge material, they add no significant strength to the floor. Since the many closely spaced openings through the cell plate weaken the plate, stiffening members must be secured to the cell plate to provide the necessary rigidity thereto and to prevent warpage of the plate as it is welded to the bag house walls or is subjected to hot gases.

Another form of bag attachment involves the use of bags having a flexible spring rim at the lower end thereof, the rim having a groove extending around the outer periphery of the bags. In such case the spring is deformed to allow the lower end of the bag to be fitted into a punched hole of the cell plate. The spring is released so that it resumes its original circular shape with the lip of the cell plate hole received within the groove.

This form of attachment is somewhat less expensive since no thimble is needed and the bag may be connected to the cell plate more rapidly and without the use of tools. However, the interior of the bag is now immediately adjacent the cell plate and the lower end of the bag is thus subject to abrasion by dirt particles as they change from a generally horizontal flow and move vertically up into the bag. Abrasion is a considerable factor in maintenance since a bag must be changed before a hole is abraded therethrough. Likewise, the bag is unprotected immediately above cell plate level and may be easily damaged by a workman's foot. Additionally, relatively costly stiffening members are required to strengthen the cell plate against warpage from heat or the weight of a workman thereon.

It is the object of the present invention to provide a manner of securing filter bags to cell plates which obtains the advantages of both of the forms mentioned above but without the disadvantages thereof and which also provides an increase in efficiency of the apparatus.

SUMMARY OF THE INVENTION

A steel sheet, such as would be used for the cell plate of the above-described bag houses, is deformed by drawing to form a plurality of annular inclined walls, each terminating in a circular opening in a plane parallel to and spaced from the plane of the sheet. After installation of the sheet in the bag house as the cell plate thereof, bags with spring rims are secured to the lip of the openings.

Because the lower ends of the bags are attached to the lips of the opening so that the lower end of the bags are spaced from the plane of the cell plate, the lower ends of the bags are protected against internal abrasion or external kicking for a substantial distance above the cell plate. In addition, the inclination of the annular wall provides a shaped orifice, reducing the pressure loss thereat and increasing the efficiency of the system. The integral inclined walls also serve to increase the rigidity of the cell plate and decrease bending and warpage thereof during installation and subsequent use.

Other objects and advantages will become apparent in the course of the following detailed description.

BRIEF DESCRIPTION OF THE DRAWINGS

In the drawings forming a part of this application, and in which like parts are designated by like reference numerals throughout the same, FIG. 1 is an elevational view, partly in section, of a typical bag house;

FIG. 2 is a sectional view, looking down on a cell plate formed in accordance with the present invention;

FIG. 3 is a sectional view and on enlarged scale, taken on line 3—3 of FIG. 2, illustrating a portion of the cell plate and showing an upwardly extending tubular filter bag attached thereto;

FIG. 4 is a sectional view of a portion of FIG. 3 and on a more enlarged scale, illustrating the attachment of the bag to a cell plate opening;

FIG. 5 is a view similar to FIG. 4 illustrating a modification of the invention;

FIG. 6 is a sectional view, in elevation, of a cell plate formed in accordance with the invention, with a tubular bag suspended therefrom and with a bag cage and venturi nozzle disposed within the bag.

DESCRIPTION OF THE PREFERRED EMBODIMENTS

Referring to the drawings, wherein preferred embodiments of the invention are illustrated, FIGS. 1 and 2 illustrate a typical arrangement of tubular filter bags 15 within a bag house. The filter bags come in a variety of standard sizes ranging from about 4 inches to about 12 inches in diameter and up to about 40 feet in length, and a particular size will be chosen for a particular installation. The bags will be arranged in banks, such as illustrated in FIG. 2 wherein the bags are positioned close to each other in each bank with about an inch clearance between bags. The banks will be separated horizontally to provide walkways between the bags so that a workman may move between the banks to clean the cell plate, inspect and/or replace bags.

In a typical system as presently used, the cell plate is formed from carbon steel sheet material, with openings punched through the flat sheet, the openings being of a diameter in accordance with the size of the bags to be used and of a pattern corresponding to the desired location of the bags in each bank thereof. After the cell plate is so formed, crosswise stiffening members, such as angle or channel irons, are welded to a face of the cell plate, and the cell plate is then installed in the bag house and welded around its perimeter to the side walls of the house.

In the present invention, the cell plate 14 is formed from carbon steel sheet material by punching an undersize hole for each bag to be used, and then deforming the plate around each hole by suitably shaped dies to draw the plate and form an annular inclined wall 21 extending outwardly from the plane of the cell plate. The original opening is then enlarged by a second punching so that the inclined wall terminates in a circular opening having its inwardly facing lip 22 lying in a plane parallel to and spaced from the plane of the cell plate. The diameter of the opening formed by lip 22 is sized in accordance with the diameter of the bag to be used therewith. As noted in FIG. 4, the wall 21 has an inside surface 23 which is of constant diameter for a substantial distance below lip 22.

In addition to the work hardening of the cell plate from the drawing thereof, the inclined walls 21, integral with and formed from the body of the cell plate, greatly increase the structural rigidity of the cell plate, particularly if the walls of two adjacent openings join each other with a continuous curvature, as shown in FIGS. 3 and 4. As a result considerably less additional stiffening of the cell plate is required, as compared to previous cell plates wherein the punched cell plate is flat on both sides, if indeed any is required at all.

After the cell plate is thus formed, it is welded into place in the bag house. The structural rigidity of the plate greatly decreases any tendency of the plate to warp from the localized heat of the welding process.

Each of the tubular bags 15, of a suitable fabric material, has its lower end turned up around a flat, spring-steel hoop 24 and pad 25, the end being sewn to the body of the bag, as at 26, to hold spring 24 and pad 25 in place. Pad 25, which may be of a felt material, has an outwardly facing groove 27 around the outer periphery thereof, and outer flat surface 28 below the groove.

In installation, the lower end of the bag is deformed by hand from its normal circular shape into a heart shape and inserted into the opening. The end is released so that the spring 24 resumes its circular shape forcing the groove 27 of the pad against the lip 22. Such attachment is quick and positive and requires no tools. The engagement of lip 22 and groove 27 will provide a seal between the bag and the cell plate to prevent leakage of dirt particles through the cell plate opening into the upper compartment of the house. In addition the sealing efficiency is considerably increased by the sealing provided by the compression of the bag fabric between the flat surface 28 of pad 25 and the surface 23 of wall 21 parallel thereto.

During operation, dirty air with solid particles entrained therein will flow generally laterally across the lower compartment from the inlet to the filter bags. The air flow must then change to a vertical direction with the result that the horizontal momentum of many of the particles will cause them to strike against the wall 21 just above the level of the lower surface of the cell plate. As is seen in FIGS. 3 and 4, the lower end of bag 15 is spaced substantially above the lower surface of the cell plate and is thus protected against the abrasion of such particles.

Also as shown in FIGS. 3 and 4, the diameter of the opening provided by wall 21 increases below bag 15 and wall 21 curves smoothly into the flat body of the cell plate. As a consequence, a shaped orifice is provided into the bag which reduces the pressure drop at the entrance to the bag and thereby increases the efficiency of the system.

With conventional flat cell plates with punched openings, the closer the spacing of the openings, the less resistance the cell plate has to bending. With the present cell plate, the rigidity is increased by a close spacing of the holes since such spacing allows the walls of adjacent openings to reinforce one another.

The raised wall 21 protects the bags from accidental hitting by a workman or by a ladder leg on the cell plate, as well as preventing a ladder leg from sliding and falling through a cell plate opening. These advantages are also possessed by previously used thimbles, but not to the degree as here since the integral steel walls 21 have much greater strength than the relatively thin thimbles.

FIG. 5 illustrates a modification of the invention wherein the drawn wall 21' of the cell plate has a constantly decreasing diameter from the body of the cell plate to the lip 22'. Such a wall is easier to form and will have the advantages previously described except that the sealing efficiency will be less since the only sealing of the bag to the cell plate will be at the lip 22', and the spacing between bags may be increased.

FIG. 5 also illustrates a modification of the bag 15 wherein the pad 25' is wrapped around spring 24 with groove 27' being formed by the spaced-apart edges of pad 25'.

FIG. 6 illustrates the use of the cell plate 14 of the present invention in an installation wherein the cell plate is disposed across the upper part of the bag house and the filter bags 15 are hung therefrom. In such an installation dirty air enters the house below the cell plate and flows through the fabric of the bags from the outside in. Since the interior of the bag is at a lower pressure, a bag cage 30 is suspended in the bag to prevent inward collapse of the bag.

Typically, the bag is periodically cleaned by directing a pulse of compressed air from above the bag down through the venturi nozzle 31 to expand the bag slightly and break off the accumulated cake of particles on its outer surface.

In prior art systems of this type, a flat cell plate with punched openings is used in conjunction with a filter bag fitting through the opening and having a bead around the upper edge thereof resting on the upper surface of the cell plate around the opening. The bag cage and venturi nozzle is installed in the bag and clamps are used to clamp the flanges 32 and 33 of the bag cage and venturi nozzle to the cell plate to seal the bead of the bag to the cell plate and to center the bag cage and venturi in the bag.

The previous system, while effective, has several drawbacks. Again, the cell plate is more easily warped, which is a matter of even more concern on this type installation. Since the bag cage is firmly clamped to the cell plate, any warpage of the plate will cause the bag cage to hang at an angle from vertical, thus increasing the likelihood of abrasion between the bag and the cage. Also, the sealing of the bag is accomplished by the engagement between the bag cage flange 32 and the bead on the bag, requiring the use of a more expensive machined flange 32 for the bag cage. The installation of the centering and hold-down clamp mechanism is expensive and the adjustment thereof is time-consuming.

These disadvantages are overcome by the present invention. Since the bag is sealed to the lip 22 and surface 23 of wall 21 in the same manner as previously described, no sealing between the cage flange 32 and the bag is necessary. As a consequence no clamping force is required and the bag cage and venturi can simply be hung in the bag as shown in FIG. 6. A less expensive bag cage flange 32 may thus be used since it is not needed for sealing purposes. The flanges 32 and 33 of the bag cage and venturi extend horizontally into close adjacency with wall 21 of the cell plate and are thus maintained centered in the bag. Since the cell plate is strengthened against warpage by its drawn walls 21, the lips 22 will be in a horizontal plane and the bag cage will hang vertically without any tendency to swing from vertical, as might be the case if the plane of lip 22 were warped from horizontal.

What is claimed is:

1. In an enclosed bag house having a horizontal cell plate dividing the interior of said house into upper and lower compartments, said bag house having means forming a gas inlet into one of said compartments and means forming a gas outlet from the other of said compartments, said cell plate being of metal sheet material and having a plurality of circular openings therethrough between said compartments and a plurality of vertically disposed tubular filter bags in one of said compartments, said bags each being open at one end and closed at the other end, said bags being attached to said cell plate with the open end of each bag being in communication with one of said cell plate openings, the improvement wherein:

each of said cell plate openings is formed by an annular wall integral with said cell plate and drawn therefrom, said wall extending vertically from the plane of said cell plate and terminating in an inwardly facing lip, said lip lying in a plane parallel to the plane of said cell plate and spaced a substantial distance vertically therefrom, and wherein at least one of said bags includes a hoop-shaped resilient spring at its open end and means forming an outwardly facing groove around the periphery of said open end of said one bag, and wherein said groove has received therewithin the lip of the annular wall forming the cell plate opening in communication with the open end of said at least one bag.

2. In a bag house improvement as set forth in claim 1, the improvement further comprising:

said annular wall of each said opening having at least a portion thereof decreasing in diameter from the plane of said cell plate towards said lip.

3. In a bag house improvement as set forth in claim 2, the improvement further comprising:

said annular wall of each said opening having a cylindrical portion of constant diameter between said decreasing diameter portion and said lip, and the groove forming means of said at least one bag further includes means forming a cylindrical surface thereon between said groove and the open end of said bag, said cylindrical surface of said bag being in sealing engagement with said cylindrical portion of said annular wall forming the cell plate opening in communication with said open end of said bag.

4. In a bag house improvement as set forth in claim 2, the improvement further comprising:

wherein said annular wall of each of said openings is sloped and defined by a curved surface located in a vertical plane with respect to the plane of said cell plate.

5. In a bag house improvement as set forth in claim 2, the improvement further comprising:

wherein said annular walls forming an adjacent pair of openings are sloped and defined by a continuously curved surface located in a vertical plane with respect to the plane of said cell plate.

6. In a bag house improvement as set forth in claim 1, the improvement further comprising:

said cell plate being disposed in said bag house with said annular walls extending downwardly therefrom, a bag cage disposed within said at least one bag, said bag cage having an annular flange at its upper end disposed below the plane of said cell plate, said flange resting on the open end of said at least one bag and extending horizontally into close adjacency with said annular wall forming the cell plate opening in communication with the open end of said at least one bag.

7. In a bag house improvement as set forth in claim 6, the improvement further comprising:

a venturi nozzle disposed within said bag cage, said venturi nozzle having an annular flange at its upper end disposed below the plane of said cell plate, said venturi nozzle flange resting on said bag cage flange and extending horizontally into close adjacency with said annular wall forming the cell plate opening in communication with the open end of said one bag.

* * * * *